United States Patent
Kondo

(10) Patent No.: US 8,865,814 B2
(45) Date of Patent: Oct. 21, 2014

(54) RUBBER COMPOSITION FOR TREAD, AND PNEUMATIC TIRE

(75) Inventor: Toshikazu Kondo, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 14/129,031

(22) PCT Filed: May 18, 2012

(86) PCT No.: PCT/JP2012/062767
§ 371 (c)(1),
(2), (4) Date: Dec. 23, 2013

(87) PCT Pub. No.: WO2013/014999
PCT Pub. Date: Jan. 31, 2013

(65) Prior Publication Data
US 2014/0135425 A1    May 15, 2014

(30) Foreign Application Priority Data

Jul. 22, 2011   (JP) .................................. 2011-161180

(51) Int. Cl.
*B60C 1/00* (2006.01)
*C08K 3/36* (2006.01)
*C08L 9/06* (2006.01)

(52) U.S. Cl.
CPC .................. *B60C 1/0016* (2013.04); *C08L 9/06* (2013.01); *Y02T 10/862* (2013.01)
USPC ............ 524/377; 524/492; 524/495; 524/526

(58) Field of Classification Search
CPC .......... B60C 1/0016; C08K 3/04; C08K 3/36; C08L 9/06; C08L 15/00; C08L 71/00; C08L 71/08
USPC .................................. 524/377, 526, 492, 495
See application file for complete search history.

(56) References Cited

U.S. PATENT DOCUMENTS

| 5,703,151 | A | 12/1997 | Yamamoto et al. |
| 6,075,092 | A * | 6/2000 | Nakamura et al. ............ 525/122 |
| 8,800,621 | B2 * | 8/2014 | Miyazaki ................... 152/209.5 |
| 2003/0119995 | A1 | 6/2003 | Hong et al. |
| 2005/0234182 | A1 * | 10/2005 | Kunisawa ..................... 524/496 |
| 2010/0108213 | A1 * | 5/2010 | Miyazaki ................... 152/209.5 |

FOREIGN PATENT DOCUMENTS

| DE | 10 2010 017 501 A1 | 12/2011 |
| JP | 9-3245 A | 1/1997 |
| JP | 2001-288299 A | 10/2001 |
| JP | 2002-88193 A | 3/2002 |
| JP | 2005-501950 A | 1/2005 |
| JP | 2005-248021 A | 9/2005 |
| JP | 2007-269964 A | 10/2007 |
| JP | 2012-121936 A | 6/2012 |

OTHER PUBLICATIONS

Machine generated translation for DE-10 2010 017 501-A1 published Dec. 22, 2011.
Machine generated translation for JP-2001-288299-A published Oct. 16, 2001.
Machine generated translation for JP-2002-88193-A published Mar. 27, 2002.
Machine generated translation for JP-2007-269964-A published Oct. 18, 2007.
Machine generated translation for JP-2012-121936-A published Jun. 28, 2012.

* cited by examiner

*Primary Examiner* — Vickey Nerangis
(74) *Attorney, Agent, or Firm* — Birch, Stewart, Kolasch & Birch, LLP

(57) ABSTRACT

Provided are a rubber composition for a tread, capable of improving the fuel economy and abrasion resistance in a balanced manner while achieving a good appearance and a good cure rate; and a pneumatic tire containing the rubber composition. The present invention relates to a rubber composition for a tread, including: a solution-polymerized styrene-butadiene rubber, carbon black, silica, and polyethylene glycol, wherein a rubber component of the rubber composition contains 60 mass % or more of the solution-polymerized styrene-butadiene rubber based on 100 mass % of the rubber component, and the rubber composition includes, per 100 parts by mass of the rubber component, 10 parts by mass or less of the carbon black, 50 parts by mass or more of the silica, and 0.1 to 3.5 parts by mass of the polyethylene glycol.

10 Claims, No Drawings

RUBBER COMPOSITION FOR TREAD, AND PNEUMATIC TIRE

TECHNICAL FIELD

The present invention relates to a rubber composition for a tread and a pneumatic tire containing the rubber composition.

BACKGROUND ART

In recent years, increased concerns about environmental issues have been requiring further improvement of the fuel economy of automobiles. This fuel economy need also applies to rubber compositions for treads of automobile tires. Further, the rubber compositions for treads are required to have abrasion resistance and other properties.

Known methods for improving the fuel economy include a method of reducing the amount of carbon black and adding silica instead and a method of using a certain solution-polymerized styrene-butadiene rubber. However, such rubber compositions containing silica or a large amount of solution-polymerized styrene-butadiene rubber unfortunately exhibit a slow cure rate in vulcanization. If the amount of vulcanization accelerator is increased to increase the cure rate, the resulting rubber compound turns white due to blooming, thereby causing appearance defects. In particular, such formulations with low carbon black content look whiter and thus result in greatly reduced marketability.

Patent Literature 1, for example, discloses a rubber composition for a tread which includes a styrene-butadiene rubber having a hydroxyl group at a molecular chain, polyethylene glycol and a specific type of carbon black and thereby improves the rolling resistance, abrasion resistance, and the like. However, there still remains room for improvement in providing pneumatic tires which can be formed at a good cure rate, and are capable of preventing appearance defects due to blooming and of improving the fuel economy and abrasion resistance in a balanced manner.

CITATION LIST

Patent Literature

Patent Literature 1: JP 2005-248021 A

SUMMARY OF INVENTION

Technical Problem

The present invention aims to solve the above problems and to provide a rubber composition for a tread, capable of improving the fuel economy and abrasion resistance in a balanced manner while achieving a good appearance and a good cure rate; and a pneumatic tire containing the rubber composition.

Solution to Problem

The present invention relates to a rubber composition for a tread, including: a solution-polymerized styrene-butadiene rubber, carbon black, silica, and polyethylene glycol, wherein a rubber component of the rubber composition contains 60 mass % or more of the solution-polymerized styrene-butadiene rubber based on 100 mass % of the rubber component, and the rubber composition includes, per 100 parts by mass of the rubber component, 10 parts by mass or less of the carbon black, 50 parts by mass or more of the silica, and 0.1 to 3.5 parts by mass of the polyethylene glycol.

The rubber composition preferably includes butadiene rubber.

The present invention also relates to a pneumatic tire, including a tread formed from the rubber composition.

Advantageous Effects of Invention

The present invention provides a rubber composition containing predetermined amounts of a solution-polymerized styrene-butadiene rubber, carbon black, silica, and polyethylene glycol. Using such a composition in a tread enables production of a pneumatic tire having improved fuel economy and improved abrasion resistance in a balanced manner. This composition also enables a good cure rate in the formation of the tire and provides a good appearance to the tire.

DESCRIPTION OF EMBODIMENTS

The rubber composition for a tread of the present invention contains relatively large amounts of a solution-polymerized styrene-butadiene rubber and silica, and relatively small amounts of carbon black and polyethylene glycol (PEG).

Adding polyethylene glycol (PEG) to a fuel-efficient formulation which contains large amounts of solution-polymerized styrene-butadiene rubber and silica and a small amount of carbon black not only enables a reduced scorch time even with a small amount of vulcanization accelerator but also provides a tread rubber with improved abrasion resistance. This makes it possible to increase the cure rate in the formation of a pneumatic tire, and at the same time, to prevent blooming due to a large amount of vulcanization accelerator and thus prevent appearance defects due to such blooming. In addition, the fuel economy and abrasion resistance can be improved in a balanced manner. Consequently, the effects mentioned above can be sufficiently provided.

The solution-polymerized styrene-butadiene rubber (solution-polymerized SBR) is not particularly limited, and examples thereof include modified SBRs (ones prepared by reacting a modifier with the active end (polymerizing end) of an SBR formed by solution polymerization) and non-modified SBRs. Combinations of modified SBR and non-modified SBR are preferred in terms of providing a good cure rate, good fuel economy, and good abrasion resistance.

The modified SBR may suitably be, for example, one modified with a compound represented by the following formula (1) disclosed in JP 2010-111753 A.

[Chem. 1]

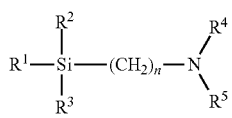

(1)

In the formula, $R^1$, $R^2$, and $R^3$ are the same as or different from one another, and each represent an alkyl, alkoxy (preferably C1 to C8 alkoxy, more preferably C1 to C6 alkoxy, still more preferably C1 to C4 alkoxy), silyloxy, acetal, carboxyl (—COOH) or mercapto (—SH) group, or a derivative thereof; $R^4$ and $R^5$ are the same as or different from each other, and each represent a hydrogen atom or an alkyl (preferably C1 to C4 alkyl) group; and the symbol n represents an integer (preferably an integer of 1 to 5, more preferably 2 to 4, and still more preferably 3).

$R^1$, $R^2$, and $R^3$ each are preferably an alkoxy group, and $R^4$ and $R^5$ each are preferably a hydrogen atom. Such structures contribute to improving the fuel economy and abrasion resistance in a balanced manner.

Specific examples of the compound represented by the formula (1) include 3-aminopropyltrimethoxysilane, 3-aminopropyltriethoxysilane, 3-aminopropyldimethylmethoxysilane, 3-aminopropylmethyldimethoxysilane, 2-dimethylaminoethyltrimethoxysilane, 3-diethylaminopropyltrimethoxysilane, and 3-dimethylaminopropyltrimethoxysilane. These may be used alone or two or more of these may be used in combination.

Styrene-butadiene rubber may be modified with the compound (modifier) represented by the formula (1) by a conventionally known method such as the methods disclosed in JP H06-53768 B, JP H06-57767 B, JP 2003-514078 T and the like. For example, styrene-butadiene rubber may be brought into contact with the modifier to effect the modification. Specific examples include a method of preparing styrene-butadiene rubber by anionic polymerization, adding a predetermined amount of a modifier to the rubber solution, and reacting the polymerizing end (active end) of the styrene-butadiene rubber with the modifier.

In terms of achieving good abrasion resistance, the modified SBR preferably has a bound styrene content of 10 mass % or more, more preferably 20 mass % or more. The bound styrene content is preferably 45 mass % or less, and more preferably 35 mass % or less.

In the present invention, the styrene content of SBR is determined by $H^1$-NMR measurement.

The amount of modified SBR based on 100 mass % of the rubber component is preferably 30 mass % or more, and more preferably 50 mass % or more, whereas it is preferably 80 mass % or less, and more preferably 70 mass % or less. With an amount within the range mentioned above, a good cure rate, good fuel economy, and good abrasion resistance can be provided.

The non-modified SBR is not particularly limited. The bound styrene content in the non-modified SBR is suitably as described for the modified SBR.

The amount of non-modified SBR based on 100 mass % of the rubber component is preferably 20 mass % or more, whereas it is preferably 50 mass % or less, and more preferably 40 mass % or less. With an amount within the range mentioned above, a good cure rate, good fuel economy, and good abrasion resistance can be provided.

The amount of solution-polymerized SBR based on 100 mass % of the rubber component is 60 mass % or more, preferably 80 mass % or more. An amount of less than 60 mass % may fail to achieve sufficient fuel economy. Although the amount may be 100 mass %, it is preferably 90 mass % or less. If the amount is more than 90 mass %, sufficient abrasion resistance may not be provided.

If the solution-polymerized SBR contains a modified SBR and a non-modified SBR, the blending ratio between the modified SBR and the non-modified SBR [(mass of modified SBR)/(mass of non-modified SBR)] is preferably 30/70 to 90/10, more preferably 45/55 to 80/20, and still more preferably 55/45 to 70/30. With a blending ratio within the range mentioned above, a good cure rate, good fuel economy, and good abrasion resistance can be provided.

Examples of other usable rubbers as the rubber component include diene rubbers such as butadiene rubber (BR), natural rubber (NR), isoprene rubber (IR), butyl rubber (IIR), chloroprene rubber (CR), and acrylonitrile rubber (NBR). Preferred among these is BR because it provides a good cure rate and is effective in improving the abrasion resistance significantly. The rubber component may contain an emulsion-polymerized styrene-butadiene rubber in an amount that does not impair the effects of the present invention. The amount of emulsion-polymerized styrene-butadiene rubber based on 100 mass % of the rubber component is preferably 5 mass % or less, and more preferably 1 mass % or less, or the rubber component may not contain any emulsion-polymerized styrene-butadiene rubber.

The BR preferably has a cis content of 80 mass % or more, more preferably 95 mass % or more. If the cis content is within the range mentioned above, better cure rate, better fuel economy, and better abrasion resistance can be provided.

The cis content (cis-1,4-butadiene unit content) of BR can be determined by infrared absorption spectrometry.

The amount of BR based on 100 mass % of the rubber component is preferably 10 mass % or more, whereas it is preferably 40 mass % or less, and more preferably 30 mass % or less. With an amount within the range mentioned above, a good cure rate, good fuel economy, and good abrasion resistance can be provided.

The combined amount of solution-polymerized SBR and BR based on 100 mass % of the rubber component is preferably 80 mass % or more, more preferably 90 mass % or more, and still more preferably 100 mass %. With such a formulation, a good cure rate, good fuel economy, and good abrasion resistance can be provided.

The carbon black is not particularly limited and may be any commonly used carbon black. The carbon black preferably has a nitrogen adsorption specific surface area ($N_2SA$) of 70 $m^2/g$ or more, more preferably 100 $m^2/g$ or more. An $N_2SA$ of less than 70 $m^2/g$ may fail to achieve sufficient reinforcement. The $N_2SA$ is preferably 150 $m^2/g$ or less, and more preferably 120 $m^2/g$ or less. An $N_2SA$ of more than 150 $m^2/g$ tends to deteriorate the fuel economy.

The $N_2SA$ of carbon black is determined in accordance with JIS K 6217-2:2001.

The amount of carbon black per 100 parts by mass of the rubber component is 10 parts by mass or less, preferably 6 parts by mass or less. An amount of more than 10 parts by mass tends to deteriorate the fuel economy. The amount is preferably 1 part by mass or more, and more preferably 3 parts by mass or more. An amount of less than 1 part by mass may fail to achieve sufficient reinforcement.

The silica is not particularly limited, and may be any commonly used silica. The silica preferably has a nitrogen adsorption specific surface area ($N_2SA$) of 100 $m^2/g$ or more, more preferably 150 $m^2/g$ or more. An $N_2SA$ of less than 100 $m^2/g$ may fail to achieve sufficient reinforcement. The $N_2SA$ is preferably 220 $m^2/g$ or less, and more preferably 190 $m^2/g$ or less. An $N_2SA$ of more than 220 $m^2/g$ tends to deteriorate the fuel economy.

The $N_2SA$ of silica is determined by the BET method in conformity with ASTM D3037-81.

The amount of silica per 100 parts by mass of the rubber component is 50 parts by mass or more, preferably 70 parts by mass or more. If the amount is less than 50 parts by mass, sufficient fuel economy may not be provided. The amount is preferably 120 parts by mass or less, and more preferably 90 parts by mass or less. An amount of more than 120 parts by mass tends to deteriorate the fuel economy.

The proportion of silica based on 100 mass % in total of silica and carbon black is preferably 60 mass % or more, and more preferably 85 mass % or more. If the proportion is less than 60 mass %, fuel economy and abrasion resistance may not be provided in a balanced manner. The proportion is preferably 98 mass % or less.

The combined amount of carbon black and silica per 100 parts by mass of the rubber component is preferably 60 parts by mass or more, and more preferably 70 parts by mass or more. A combined amount of less than 60 parts by mass may fail to achieve sufficient reinforcement. The combined amount is preferably 130 parts by mass or less, and more preferably 100 parts by mass or less. A combined amount of more than 130 parts by mass may lead to insufficient fuel economy.

The rubber composition of the present invention preferably contains a silane coupling agent. Any silane coupling agent conventionally used together with silica in the rubber industry may be used. Examples thereof include sulfide silane coupling agents such as bis(3-triethoxysilylpropyl)disulfide, mercapto silane coupling agents such as 3-mercaptopropyltrimethoxysilane, vinyl silane coupling agents such as vinyltriethoxysilane, amino silane coupling agents such as 3-aminopropyltriethoxysilane, glycidoxy silane coupling agents such as γ-glycidoxypropyltriethoxysilane, nitro silane coupling agents such as 3-nitropropyltrimethoxysilane, and chloro silane coupling agents such as 3-chloropropyltrimethoxysilane. Preferred among these are sulfide silane coupling agents, and more preferred is bis(3-triethoxysilylpropyl)disulfide.

The amount of silane coupling agent per 100 parts by mass of silica is preferably 1 part by mass or more, and more preferably 4 parts by mass or more, whereas it is preferably 15 parts by mass or less, and more preferably 10 parts by mass or less. With an amount within the range mentioned above, the effects of the present invention can be well achieved.

The polyethylene glycol is not particularly limited, and may suitably be represented by the following formula:

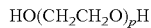

wherein p represents an integer of 5 to 100.

In terms of achieving a good cure rate and good abrasion resistance, p is preferably 80 to 100.

The polyethylene glycol preferably has a weight average molecular weight of 1000 or more, more preferably 3000 or more. The weight average molecular weight is preferably 10000 or less, and more preferably 5000 or less. The polyethylene glycol with a weight average molecular weight within the range mentioned above provides better cure rate and better abrasion resistance, thereby contributing to achieving the effects of the present invention well.

Herein, the weight average molecular weight (Mw) of polyethylene glycol can be determined by gel filtration chromatography using an LC-6A device, an RID-10A detector (both produced by Shimadzu Corporation) and an Asahipak GF-510HQ column (7.6 mm diameter×0.3 m long, produced by Showa Denko K.K.) with a water mobile phase at a flow rate of 1 mL/min and a temperature of 30° C.

The amount of polyethylene glycol per 100 parts by mass of the rubber component is 0.1 parts by mass or more, preferably 0.3 parts by mass or more, and more preferably 0.5 parts by mass or more. If the amount is less than 0.1 parts by mass, the effects of the invention may not be well achieved. The amount is 3.5 parts by mass or less, preferably 3 parts by mass or less, and more preferably 2.5 parts by mass or less. An amount of more than 3.5 parts by mass tends to cause too short a scorch time.

The rubber composition of the present invention preferably contains sulfur as a vulcanizing agent. The amount of sulfur per 100 parts by mass of the rubber component is preferably 0.3 to 3.0 parts by mass, more preferably 0.5 to 2.5 parts by mass, and still more preferably 1.0 to 2.0 parts by mass. An amount of less than 0.5 parts by mass tends to cause a slow cure rate and undercure and thus fail to achieve sufficient abrasion resistance and the like. Conversely, an amount of more than 3.0 parts by mass tends to cause a rapid cure rate and compound scorch and thus reduce the abrasion resistance and the like.

The rubber composition of the present invention typically contains a vulcanization accelerator. The vulcanization accelerator is not particularly limited and may be any commonly used vulcanization accelerator, including guanidine compounds, aldehyde-amine compounds, aldehyde-ammonia compounds, thiazole compounds, sulfenamide compounds, thiourea compounds, thiuram compounds, dithiocarbamate compounds, and xanthate compounds. These vulcanization accelerators may be used alone, or two or more of these may be used in combination.

From the viewpoints of dispersibility into the rubber compound and stability of the vulcanization properties, preferred among these are sulfenamide vulcanization accelerators (e.g., N-tert-butyl-2-benzothiazolylsulfenamide (TBBS), N-cyclohexyl-2-benzothiazolylsulfenamide (CBS), N,N-dicyclohexyl-2-benzothiazolylsulfenamide (DCBS), N,N-diisopropyl-2-benzothiazolesulfenamide), and guanidine vulcanization accelerators (e.g., N,N'-diphenylguanidine (DPG), di-ortho-tolylguanidine, triphenylguanidine, ortho-tolyl biguanide, diphenylguanidine phthalate). More preferred are combinations of sulfenamide vulcanization accelerators with guanidine vulcanization accelerators, and particularly preferred is a combination of CBS and DPG.

The amount of vulcanization accelerator per 100 parts by mass of the rubber component is preferably 1 to 5 parts by mass, and more preferably 2 to 4 parts by mass. Since the rubber composition of the present invention contains the components mentioned above to achieve a good cure rate, the amount of vulcanization accelerator can be reduced to give a good appearance.

In addition to the above components, the rubber composition of the present invention may optionally contain compounding agents generally used for production of rubber compositions, such as various antioxidants, stearic acid, zinc oxide, waxes, oils, and vulcanizing agents.

Examples of oils include process oils, vegetable fats and oils, and mixtures of these. Examples of process oils include paraffinic process oils, aromatic process oils, and naphthenic process oils.

If the rubber composition of the present invention contains an oil (s), the amount of oil per 100 parts by mass of the rubber component is preferably 5 parts by mass or more, and more preferably 10 parts by mass or more, whereas it is preferably 30 parts by mass or less, and more preferably 20 parts by mass or less.

The rubber composition of the present invention can be prepared by an ordinary method. Specifically, in an exemplary preparation method, the above components are kneaded in a Banbury mixer, a kneader, an open roll mill or the like, and then vulcanized.

The rubber composition of the present invention is for use in a tread of a tire.

The pneumatic tire of the present invention may be prepared using the rubber composition by an ordinary method. Specifically, an unvulcanized rubber composition containing the above components is extruded into a tread shape, and assembled with other tire components in a usual manner in a tire building machine to build an unvulcanized tire. This unvulcanized tire is heat-pressurized in a vulcanizer to form a tire.

The pneumatic tire of the present invention can be suitably used as a tire for passenger vehicles or the like.

EXAMPLES

Hereinafter, the present invention will be described in more detail with reference to examples which are not intended to limit the scope of the present invention.

The following are the list of various chemicals used in the examples and comparative examples.

SSBR (1): HPR355 (solution-polymerized SBR (terminated with an alkoxysilane by coupling; $R^1$, $R^2$, and $R^3$ each represent —$OCH_3$; $R^4$ and $R^5$ each represent H; n represents 3) produced by JSR Corporation, styrene content: 28 mass %, vinyl content: 56 mass %)

SSBR (2): T3830 (Tufdene 3830) (solution-polymerized SBR, styrene content: 33 mass %, vinyl content: 34 mass %, Mw: 950,000, Mn: 370,000, Mw/Mn: 2.6; containing 37.5 parts by mass of oil per 100 parts by mass of rubber solids) produced by Asahi Kasei Corp.

SSBR (3): modified SBR (solution-polymerized SBR (terminated with an alkoxysilane by coupling; $R^1$, $R^2$, and $R^3$ each represent —$OCH_3$; $R^4$ and $R^5$ each represent —$CH_2CH_3$; n represents 3) produced by Sumitomo Chemical Co., Ltd., styrene content: 25 mass %, vinyl content: 57 mass %)

BR: Nipol BR 1220 (cis content: 97 mass % or more) produced by ZEON CORPORATION

NR: TSR

Carbon black: Seast N220 ($N_2SA$: 114 $m^2/g$) produced by Mitsubishi Chemical Corporation Silica: Ultrasil VN3 (average primary particle size: 15 nm, $N_2SA$: 175 $m^2/g$) produced by Evonik Degussa Silane coupling agent: Si266 (bis(3-triethoxysilylpropyl) disulfide) produced by Evonik Degussa Aromatic oil: Process X-140 produced by JX Nippon Oil & Energy Corporation Wax: Sunnoc N produced by Ouchi Shinko Chemical Industrial Co., Ltd.

Antioxidant: Antigene 6C (N-(1,3-dimethylbutyl)-N'-phenyl-p-phenylenediamine) produced by Sumitomo Chemical Co., Ltd.

Stearic acid: stearic acid "Tsubaki" produced by NOF Corporation

PEG: PEG #4000 (polyethylene glycol, weight average molecular weight: 4000) ($HO(CH_2CH_2O)_pH$ where p is about 90) produced by NOF Corporation Zinc oxide: zinc oxide #1 produced by Mitsui Mining & Smelting Co., Ltd.

Sulfur: powdered sulfur produced by Karuizawa sulfur

Vulcanization accelerator (1): Nocceler CZ (N-cyclohexyl-2-benzothiazolylsulfenamide) produced by Ouchi Shinko Chemical Industrial Co., Ltd.

Vulcanization accelerator (2): Nocceler D (N,N'-diphenylguanidine) produced by Ouchi Shinko Chemical Industrial Co., Ltd.

Examples and Comparative Examples

According to each of the formulations shown in Table 1, the chemicals, excepting the sulfur and vulcanization accelerators, were kneaded in a 1.7-L Banbury mixer produced by Kobe Steel, Ltd. To the resulting kneaded mixture were then added the sulfur and vulcanization accelerators, and the mixture was kneaded using an open roll mill to prepare an unvulcanized rubber composition. The unvulcanized rubber composition was press vulcanized in a 2-mm-thick mold at 170° C. for 15 minutes to prepare a vulcanized rubber composition (vulcanized rubber sheet).

Also, the unvulcanized rubber composition was formed into a tread shape and assembled with other tire components in a tire building machine, and the assembly was vulcanized at 170° C. for 15 minutes to prepare a test tire (tire size: 195/65R15).

The obtained unvulcanized rubber compositions, vulcanized rubber compositions, and test tires were evaluated for the following items. Table 1 shows the results.

(Mooney Viscosity, Scorch Time)

The measurement was performed using a Mooney viscosity tester "Mooney viscometer SMV-202" produced by Shimadzu Corporation in conformity with JIS K6300, "Rubber, unvulcanized—Physical testing methods". The temperature of the tester was conditioned to 130° C. by 1-minute preheating and a small rotor was rotated at this temperature. The Mooney viscosity ($ML_{1+4}$) of each unvulcanized rubber composition was measured after four-minute rotation of the small rotor. The time (scorch time (min): T5) at which the viscosity of the unvulcanized rubber composition rose by five points was also measured. Lower Mooney viscosity indicates better processability, and a shorter scorch time indicates a shorter cure time.

A scorch time of at least 15 minutes but shorter than 25 minutes is particularly good from the viewpoint of both cure time and extrusion processability. A scorch time of at least 10 minutes but shorter than 15 minutes is likely to cause compound scorch in the extrusion process, and a scorch time of shorter than 10 minutes causes compound scorch. A scorch time of 25 minutes or longer causes too long a cure time.

(Processability)

The processability was evaluated depending on the scorch time data according to the following criteria.

Good: The scorch time is at least 15 minutes but shorter than 25 minutes.

Acceptable: The scorch time is at least 10 minutes but shorter than 15 minutes, or at least 25 minutes but shorter than 30 minutes.

Poor: The scorch time is shorter than 10 minutes, or 30 minutes or longer.

(Hs)

The hardness (Hs) of each vulcanized rubber sheet was measured in conformity with JIS K6253. The measuring temperature was 23° C.

(Viscoelasticity Test)

Using a viscoelasticity spectrometer produced by Iwamoto Seisakusho Co., Ltd., the loss tangent (tan δ) and complex viscoelastic modulus (E*) at 70° C. of each vulcanized rubber sheet were determined at a frequency of 10 Hz, an initial strain of 10%, and a dynamic strain of 2%. The tan δ and E* values of each rubber formulation are each expressed as an index (tan δ index or E* index) relative to that of Comparative Example 1 (=100). A higher tan δ index indicates less heat build-up and better fuel economy, and a higher E*index indicates higher E* and higher rubber hardness.

(Abrasion Resistance)

The test tires of each formulation example were mounted on a car and the car was driven 30,000 km. Then, the changes in the groove depth of the tread before and after driving were measured. The mileage at which the groove depth was reduced by 1 mm was determined and the value obtained is expressed as an index calculated from the following formula. A higher index indicates better abrasion resistance.

(Abrasion resistance index)=(the mileage at which the groove depth was reduced by 1 mm in each formulation example)/(the mileage at which the groove depth was reduced by 1 mm in Comparative Example 1)×100

(Bloom Test)

Each vulcanized rubber sheet was left in a sunny place for one month. The appearance of the resulting sheet was visually observed for evaluation according to the following criteria.

Very good: The sheet did not turn white.
Good: The sheet turned slightly white.
Poor: The sheet turned white and thus had a poor appearance.

TABLE 1

| | | Comparative Example 1 | Comparative Example 2 | Example 1 | Example 2 | Example 3 | Comparative Example 3 | Comparative Example 4 | Comparative Example 5 | Comparative Example 6 | Example 4 |
|---|---|---|---|---|---|---|---|---|---|---|---|
| Chemical Material Composition (parts by mass) | SSBR (1) | 55 | 55 | 55 | 55 | 55 | 26 | 55 | 55 | 55 | 55 |
| | SSBR (2) (net rubber content) | 48 (30) | 48 (30) | 48 (30) | 48 (30) | 48 (30) | 37.3 (14) | 48 (30) | 48 (30) | 48 (30) | 48 (30) |
| | BR | 15 | 15 | 15 | 15 | 15 | 15 | 15 | 15 | 15 | 15 |
| | NR | — | — | — | — | — | 45 | — | — | — | — |
| | Carbon black | 5 | 5 | 5 | 5 | 5 | 5 | 5 | 35 | 5 | 5 |
| | Silica | 75 | 75 | 75 | 75 | 75 | 75 | 75 | 45 | 75 | 75 |
| | Silane coupling agent | 6 | 6 | 6 | 6 | 6 | 6 | 6 | 3.6 | 6 | 6 |
| | Aromatic oil | 15 | 15 | 15 | 15 | 15 | 15 | 15 | 15 | 15 | 15 |
| | Wax | 2.5 | 2.5 | 2.5 | 2.5 | 2.5 | 2.5 | 2.5 | 2.5 | 2.5 | 2.5 |
| | Antioxidant | 2.5 | 2.5 | 2.5 | 2.5 | 2.5 | 2.5 | 2.5 | 2.5 | 2.5 | 2.5 |
| | Stearic acid | 2.5 | 2.5 | 2.5 | 2.5 | 2.5 | 2.5 | 2.5 | 2.5 | 2.5 | 2.5 |
| | PEG | — | — | 0.3 | 3 | 3 | 3 | 10 | 3 | — | 1.5 |
| | Zinc oxide | 2.5 | 2.5 | 2.5 | 2.5 | 2.5 | 2.5 | 2.5 | 2.5 | 2.5 | 2.5 |
| | Sulfur | 1.5 | 1.5 | 1.5 | 1.5 | 1.5 | 1.5 | 1.5 | 1.5 | 1.5 | 1.5 |
| | Vulcanization accelerator (1) | 2 | 2 | 2 | 2 | 2 | 2 | 2 | 2 | 2 | 2 |
| | Vulcanization accelerator (2) | 2 | 2.5 | 1.5 | 1.5 | 0.8 | 0.6 | 0.8 | 0.8 | 1.5 | 1.5 |
| Evaluation | Total | 234.5 | 235 | 234.3 | 237 | 236.3 | 241.4 | 243.3 | 233.9 | 234 | 234 |
| | Mooney viscosity | 65 | 65 | 64 | 60 | 60 | 52 | 55 | 58 | 65 | 60 |
| | Scorch time | 32 | 22 | 22 | 16 | 18 | 5 | 6 | 7 | 40 | 18 |
| | Processability | Poor | Good | Good | Good | Good | Poor | Poor | Poor | Poor | Good |
| | Hs | 66 | 66 | 66 | 66 | 66 | 65 | 65 | 66 | 66 | 66 |
| | E* (Mpa) index | 100 | 102 | 100 | 99 | 98 | 95 | 95 | 99 | 100 | 99 |
| | tan δ index | 100 | 99 | 100 | 99 | 98 | 98 | 100 | 104 | 100 | 99 |
| | Abrasion resistance index | 100 | 99 | 103 | 107 | 106 | 100 | 105 | 104 | 100 | 108 |
| | Bloom test | Good | Poor | Good | Good | Very good | Good | Very good | Good | Very good | Good |

TABLE 2

| | | Comparative Example 7 | Example 5 |
|---|---|---|---|
| Chemical Material Composition (parts by mass) | SSBR (3) | 55 | 55 |
| | SSBR (2) (net rubber content) | 48 (30) | 48 (30) |
| | BR | 15 | 15 |
| | NR | — | — |
| | Carbon black | 5 | 5 |
| | Silica | 75 | 75 |
| | Silane coupling agent | 6 | 6 |
| | Aromatic oil | 15 | 15 |
| | Wax | 2.5 | 2.5 |
| | Antioxidant | 2.5 | 2.5 |
| | Stearic acid | 2.5 | 2.5 |
| | PEG | — | 3 |
| | Zinc oxide | 2.5 | 2.5 |
| | Sulfur | 1.5 | 1.5 |
| | Vulcanization accelerator (1) | 2 | 2 |
| | Vulcanization accelerator (2) | 2 | 1.5 |
| Evaluation | Total | 234.5 | 237 |
| | Mooney viscosity | 65 | 62 |
| | Scorch time | 31 | 16 |
| | Processability | Poor | Good |
| | Hs | 66 | 67 |
| | E* (Mpa) index | 100 | 100 |
| | tan δ index | 100 | 99 |
| | Abrasion resistance index | 100 | 106 |
| | Bloom test | Good | Good |

Tables 1 and 2 demonstrated that adding a predetermined amount of polyethylene glycol to a rubber composition containing predetermined amounts of a solution-polymerized styrene-butadiene rubber, carbon black, and silica improves the fuel economy and abrasion resistance in a balanced manner while achieving a good appearance and a good cure rate. The formulation of Example 3, containing a less amount of vulcanization accelerators than in Example 2, achieved a good cure rate and also exhibited improved abrasion resistance and appearance.

In contrast, the formulation of Comparative Example 1 caused a longer scorch time and thus had poor processability. The formulations of Comparative Examples 3 to 5 each caused a shorter scorch time and thus had poor processability. The formulation of Comparative Example 2, containing a large amount of vulcanization accelerators, caused a poor appearance due to blooming. The formulation of Comparative Example 6, though achieving a good cure rate and a good appearance, did not show an effect of improving the abrasion resistance.

The invention claimed is:

1. A rubber composition for a tread, comprising:
   a modified solution-polymerized styrene-butadiene rubber,
   a non-modified styrene-butadiene rubber,
   carbon black,
   silica, and
   polyethylene glycol,
   the modified solution-polymerized styrene-butadiene rubber being one modified with a compound represented by the following formula (1):

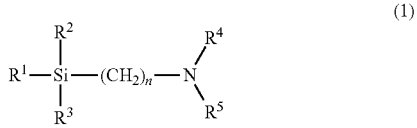

wherein, in formula (1), $R^1$, $R^2$, and $R^3$ are the same as or different from one another, and each represents an alkyl, alkoxy, silyloxy, acetal, carboxyl or mercapto group, or a derivative thereof; $R^4$ and $R^5$ are the same as or different from each other, and each represents a hydrogen atom or an alkyl group; and the symbol n represents an integer; and
   wherein a rubber component of the rubber composition contains 60 mass % or more of the modified solution-polymerized styrene-butadiene rubber based on 100 mass % of the rubber component, and
   the rubber composition comprises, per 100 parts by mass of the rubber component, 10 parts by mass or less of the carbon black, 50 parts by mass or more of the silica, and 0.1 to 3.5 parts by mass of the polyethylene glycol.

2. The rubber composition for a tread according to claim 1, comprising butadiene rubber.

3. The rubber composition for a tread according to claim 2, wherein the amount of butadiene rubber based on 100 mass % of the rubber component is 10 to 40 mass %.

4. The rubber composition for a tread according to claim 1, wherein the modified solution-polymerized styrene-butadiene rubber and the non-modified styrene-butadiene rubber have a bound styrene content of 10 mass % or more.

5. The rubber composition for a tread according to claim 1, wherein the amount of the modified solution-polymerized styrene-butadiene rubber is 30 to 80 mass %, and the amount of the non-modified styrene-butadiene rubber is 20 to 50 mass %, based on 100 mass % of the rubber component, and
   the blending ratio between the modified solution-polymerized styrene-butadiene rubber and the non-modified styrene-butadiene rubber is 30/70 to 90/10.

6. The rubber composition for a tread according to claim 1, wherein the carbon black has a nitrogen adsorption specific surface area of 70 to 150 $m^2/g$, and
   the silica has a nitrogen adsorption specific surface area of 100 to 220 $m^2/g$.

7. The rubber composition for a tread according to claim 1, wherein the proportion of the silica based on 100 mass % in total of the silica and the carbon black is 60 mass % or more, and
   the combined amount of the carbon black and the silica per 100 parts by mass of the rubber component is 60 to 130 parts by mass.

8. The rubber composition for a tread according to claim 1, said rubber composition further comprising sulfur, a vulcanization accelerator, and an oil;
   wherein, per 100 parts by mass of the rubber component, the amount of sulfur is 0.3 to 3.0 parts by mass, the amount of vulcanization accelerator is 1 to 5 parts by mass, and the amount of oil is 5 to 30 parts by mass.

9. A pneumatic tire, comprising a tread formed from the rubber composition according to claim 1.

10. A pneumatic tire, comprising a tread formed from the rubber composition according to claim 2.

* * * * *